(12) United States Patent
Abe et al.

(10) Patent No.: US 7,514,818 B2
(45) Date of Patent: Apr. 7, 2009

(54) POWER SUPPLY SYSTEM

(75) Inventors: Hideaki Abe, Neyagawa (JP); Hiroyasu Kitamura, Hirakata (JP); Mikihiro Yamashita, Eti (JP)

(73) Assignee: Matsushita Electric Works, Ltd., Oaska (JP)

( * ) Notice: Subject to any disclaimer, the term of this patent is extended or adjusted under 35 U.S.C. 154(b) by 285 days.

(21) Appl. No.: 11/585,219

(22) Filed: Oct. 24, 2006

(65) Prior Publication Data
US 2007/0091519 A1      Apr. 26, 2007

(30) Foreign Application Priority Data
Oct. 26, 2005   (JP)   .............................. 2005-311087

(51) Int. Cl.
*H01F 27/42*   (2006.01)

(52) U.S. Cl. ...................................... 307/104

(58) Field of Classification Search .................. 307/104
See application file for complete search history.

(56) References Cited

FOREIGN PATENT DOCUMENTS

| | | |
|---|---|---|
| CN | 2304177 | 1/1999 |
| JP | 10-270273 | 10/1998 |

*Primary Examiner*—Robert L. DeBeradinis
(74) *Attorney, Agent, or Firm*—Bacon & Thomas, PLLC

(57) ABSTRACT

A power supply system is capable of feeding electric power from a power adapter to a plurality of load devices. The power adapter includes a primary core; and a primary coil wound around the primary core for serving as a output port of the power adapter to output an alternating current. The load devices include secondary cores for simultaneously forming magnetic circuits between the primary core and the load devices; and secondary coils wound around the secondary cores for feeding output power to the load devices. The primary core has two pairs of protrusions, and the secondary cores are arranged on opposite sides of the primary core in such a manner that the primary core lies between the secondary cores to feed electric power simultaneously to the load devices.

6 Claims, 18 Drawing Sheets

POWER SUPPLY SYSTEM

FIELD OF THE INVENTION

The present invention relates to a power supply system capable of feeding electric power from a single power adaptor to a plurality of load devices and, more specifically, to a power supply system in which a power feeding operation is performed by contactless power transmission based on electromagnetic induction.

BACKGROUND OF THE INVENTION

One example of power supply systems capable of feeding electric power from a single power adaptor to a plurality of load devices is an electric shaver with a cleaning device. FIGS. 21A and 21B show configurations of a power supply system for use in the electric shaver. As shown in FIG. 21A, an electric shaver 2 can be connected to a power adapter 1 which is formed of a RCC (ringing choke converter) and the like. As illustrated in FIG. 21B, a cleaning device 3 can also be connected to the power adapter 1. As depicted in FIG. 21B, it is possible not only to cleanse a blade of the electric shaver 2 but also to electrically charge the electric shaver 2 under the state that the electric shaver 2 is mounted on the cleaning device 3.

In this case, since the power adapter 1 is outputting a direct current of, e.g., 12V, the task of feeding electric power to a cleaning device driving circuit 4 in the cleaning device 3 and the task of charging the electric shaver 2 mounted on the cleaning device 3 are performed through branch lines just in that condition. However, the power adapter 1 needs to be connected to the cleaning device 3 or the electric shaver 2 by way of a contacting type contact point 5. Furthermore, due to the fact that the power adapter 1 is feeding electric power of a voltage as high as 12V to match the cleaning device 3 of high power consumption, the electric shaver 2 requires the use of a step-down power converter 7 for dropping the voltage to a level suitable for charging a secondary battery 6. Thus, the electric shaver 2 grows in size.

In the meantime, demand has existed for non-contact or contactless power feeding in an electric shaver which is frequently used in a water-abundant environment, e.g., in a lavatory. FIG. 22 illustrates a conventional power supply system by which power feeding is conducted in a contactless manner. A commercial alternating current inputted to a power adapter 12 through a power cord 11 is converted to a direct current in a converter 13. The direct current is converted to a high frequency alternating current in a voltage-resonant inverter 14 and then outputted from a primary coil 15 which is an output port of the power adapter 12.

The primary coil 15 is magnetically coupled in a detachable manner to a secondary coil 17 which is an input port of an electric shaver 16. The alternating voltage developed in the secondary coil 17 is converted to a direct voltage in a converter circuit 18 and then fed to a load 19 which is formed of a secondary battery and an electric motor. The converter circuit 18 is an A/D converter whose size is smaller than that of a DC-DC converter of the step-down power converter 7 noted above.

Accordingly, the configurations depicted in FIGS. 23A and 23B are provided if the contactless power supply system illustrated in FIG. 22 is applied to the power supply system shown in FIGS. 21A and 21B, to which a plurality of load devices including the cleaning device 3 is connectable.

A power adapter 21, which is formed of a voltage-resonant inverter and so forth, serves to output an alternating current of, e.g., 50 kHz and 30V, to a power transmission coil 24. A power receiving coil 25 of an electric shaver 22 can be connected in a contactless manner to the power transmission coil 24 as shown in FIG. 23A. Likewise, a power receiving coil 26 of a cleaning device 23 can be connected in a contactless manner to the power transmission coil 24 as shown in FIG. 23B.

As can be seen in FIG. 23B, an A/D converter 27 is provided in the cleaning device 23. The A/D converter 27 is adapted to generate, e.g., a direct current of 12V, and feed the same to a cleaning device driving circuit 28. In order to charge the electric shaver 22 kept mounted on the cleaning device 23, an inverter 29 formed of a voltage-resonant inverter and the like for outputting an alternating current of, e.g., 50 kHz and 30V, and a power transmission coil 30 are provided in the cleaning device 23.

In this regard, one example of parallel power feeding techniques using electromagnetic induction is disclosed in, e.g., Japanese Laid-open Application H3-101110A. The prior art reference is directed to an electromagnetic outlet socket device in which a plurality of primary coils serving as a socket body are embedded into a wall in parallel and a load-connected secondary coil serving as a socket cap is fitted into the socket body, thereby making it possible to simultaneously feed electric power to a plurality of loads in parallel and in a contactless fashion. Therefore, the prior art reference teaches nothing but a structure of electromagnetic coupling parts.

In the configurations shown in FIGS. 23A and 23B, the converter 27 and the inverter 29 need to be additionally provided in the cleaning device 23 for the purpose of realizing a contactless power feeding operation. This leads to an increase in size and costs.

DISCLOSURE OF THE INVENTION

In view of the foregoing and other problems, it is an object of the present invention to provide a power supply system that can feed electric power from a single power adaptor to a plurality of load devices in a contactless manner, while simplifying the configuration of the load devices.

In accordance with the present invention, there is provided a power supply system for feeding electric power from a power adapter to a plurality of load devices, wherein the power adapter includes a primary core; and a primary coil wound around the primary core for serving as a output port of the power adapter to output an alternating current, and wherein the load devices include secondary cores for simultaneously forming magnetic circuits between the primary core and the load devices; and secondary coils wound around the secondary cores for feeding output power to the load devices.

According to the configuration recited above, it is possible to feed electric power from a single power adapter to a plurality of load devices separately or simultaneously. To this end, a high frequency alternating current is used as an output power, and the primary core and the primary coil wound around the primary core are used as an output port. In the meantime, the load devices are provided with secondary cores capable of forming magnetic circuits with the primary core and secondary coils wound around the secondary cores. This makes it possible to generate output power to be fed. Thus, it is possible to obtain a desired output voltage by adjusting a coil winding ratio or magnetic flux interlinkage of the coils. In this way, electric power can be fed from a single power adapter to a plurality of load devices in a contactless manner. In the present invention, the cores are formed into such a shape as to simultaneously form magnetic circuits on a load device basis, thereby making it possible to perform a parallel power feeding operation.

Accordingly, in the course of feeding electric power to a plurality of load devices in a contactless fashion, the input ports of the plurality of load devices can be connected to the output port of the single power adapter to thereby perform a parallel power feeding operation. This eliminates the need to provide a power conversion unit, such as a converter or an inverter, which would otherwise be required in transmitting electric power from one load device to another. Thus, the configuration of the power supply system can be simplified.

Preferably, the primary core has two pairs of protrusions, each of the pairs of the protrusions extending in a same direction, and one of the pairs of protrusions oriented in an opposite direction with respect to the other of the pairs of the protrusions, and he secondary cores, each of which has a pair of protrusions extending in a same direction, are arranged on opposite sides of the primary core in such a manner that the primary core lies between the secondary cores to feed electric power simultaneously to the load devices.

According to the configuration recited above, electric power can be fed to two load devices with a simple structure by adopting a three-stage stack structure in which the secondary cores are arranged on opposite sides of the primary core in such a manner that the primary core lie between the secondary cores.

Preferably, the primary core has two pairs of protrusions and a shaft portion wound with the primary coil, each of the pairs of protrusions extending in a same direction from the shaft portion, and one of the pairs of protrusions oriented in an orthogonal direction with respect to the other of the pairs of protrusions. Further, each of the secondary cores has two pairs of protrusions, each of the pairs of protrusions extending in a same direction, and the secondary cores arranged in such a manner that the secondary cores form an "L"-shape with the primary core when viewed from an axial direction of the shaft portion to feed electric power simultaneously to the load devices.

According to the configuration recited above, two secondary cores are arranged so as to form an "L"-like shape with a primary core. Thus, in case where one load device is slantingly mounted on the other load device, the primary core can be placed in close proximity with the secondary cores received in the respective load devices.

Preferably, the primary core is formed in a bobbin shape and the secondary cores are formed in a square bracket shape, the secondary cores arranged in plural numbers around the primary core in such a manner that opposite ends of the secondary cores face flanges of the primary core to feed electric power simultaneously to the load devices.

According to the configuration recited above, the flanges of a bobbin are allowed to serve as protrusions extending from the primary core toward the secondary cores. Thus, magnetic paths can be formed by merely arranging the secondary cores around the primary core. This means that the secondary cores can be arranged in the number decided by the diameter or the like of the secondary coils wound around the center portion of the square-bracket-shaped secondary cores.

Therefore, it is possible to simultaneously feed electric power to a large number of load devices with a simplified structure.

Preferably, an electric shaver serves as a first load device of the load devices, and a cleaning device used for the electric shaver serves as a second load device of the load devices.

Further, the electric shaver is to be fed with the electric power directly from the power adapter and to be electrically charged in a state that the electric shaver is mounted on the cleaning device.

According to the configuration recited above, use is made of the three-stage stack structure or the "L"-like structure that allows the primary core to be simply inserted between the cleaning device and the electric shaver mounted on the cleaning device. Thus, it is desirable for the electric shaver system to employ the three-stage stack structure or the "L"-like structure.

As set forth above, the power supply system of the present invention makes it possible to feed electric power from a single power adapter to a plurality of load devices separately or simultaneously. To this end, a high frequency alternating current is used as an output power, and the primary core and the primary coil wound around the primary core are used as an output port. In the meantime, the load devices are provided with secondary cores capable of forming magnetic circuits with the primary core and secondary coils wound around the secondary cores. This makes it possible to generate output power to be fed. In the present invention, the cores are formed into such a shape as to simultaneously form magnetic circuits on a load device basis, thereby making it possible to perform a parallel power feeding operation.

Accordingly, in the course of feeding electric power to a plurality of load devices in a contactless fashion, the input ports of the plurality of load devices can be connected to the output port of the single power adapter to thereby perform a parallel power feeding operation. This eliminates the need to provide a power conversion unit, such as a converter or an inverter, which would otherwise be required in transmitting electric power from one load device to another. Thus, the configuration of the power supply system can be simplified.

DETAILED DESCRIPTION OF THE PREFERRED EMBODIMENTS

First Embodiment

Figure 1A:
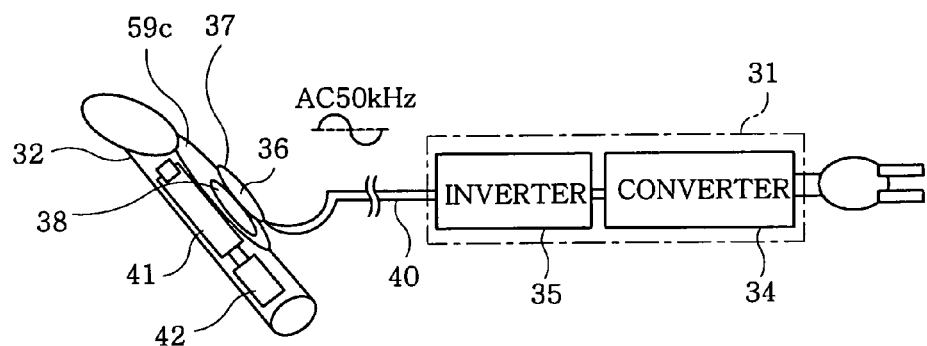
FIGS. 1A and 1B show configurations of a power supply system in accordance with a first embodiment of the present invention.
Figure 1B:
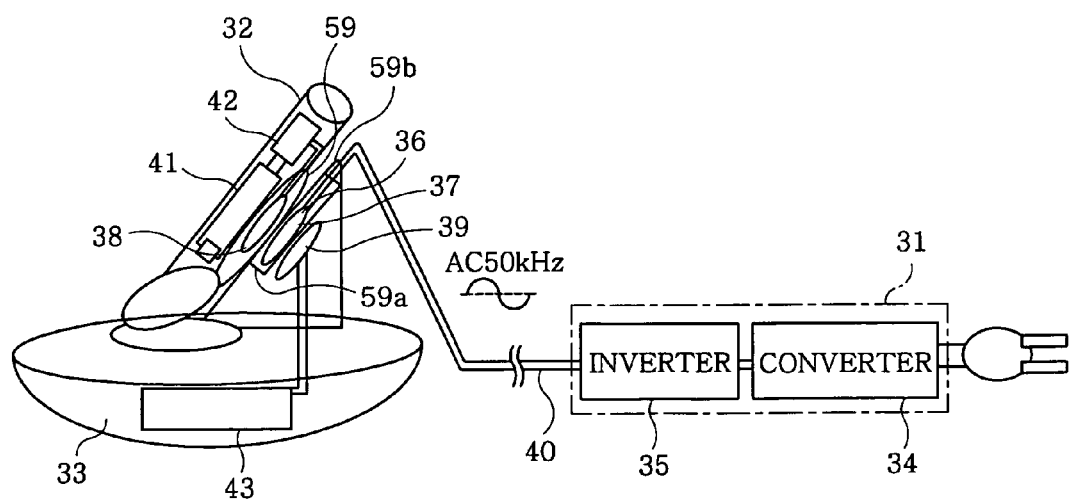
Figure 2A:
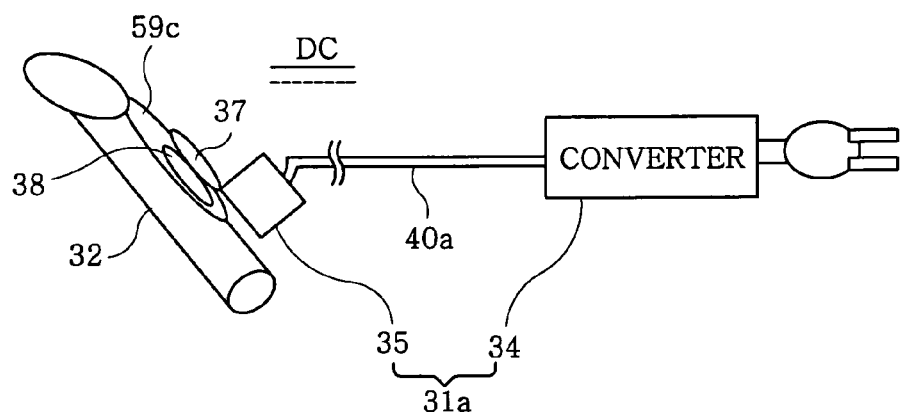
FIGS. 2A and 2B show other configurations of a power supply system in accordance with the first embodiment of the present invention.
Figure 2B:
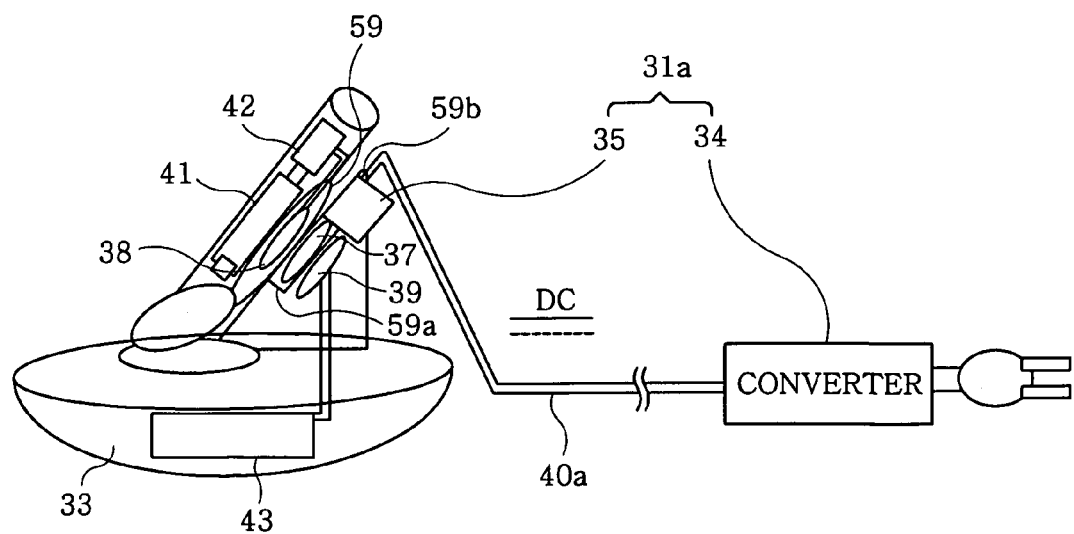

FIGS. 1A to 2B show configurations of a power supply system in accordance with a first embodiment of the present invention. The power supply system is for use in an electric shaver with a cleaning device. As shown in FIGS. 1A and 2A, an electric shaver 32 can be connected to a single power adapter 31 or 31a. As illustrated in FIGS. 1B and 2B, a cleaning device 33 can also be connected to the power adapter 31 or 31a. Referring to FIGS. 1B and 2B, it is possible not only to cleanse a knife edge of the electric shaver 32 but also to electrically charge the electric shaver 32 under the state that the electric shaver 32 is mounted on the cleaning device 33.

The power adapter 31 or 31a includes a converter 34, which is formed of a diode bridge, a smoothing capacitor and the like, and a voltage-resonant inverter 35. The power adapter 31 or 31a is adapted to output an alternating current of, e.g., 50 kHz and 30V, to a power transmission coil 37 of a single power feeding plug 36 that serves as an output port and constitutes a primary coil of a transformer. A power receiving coil 38 of the electric shaver 32 that serves as an input port and constitutes a secondary coil of the transformer can be connected to the power transmission coil 37 in a contactless manner as illustrated in FIGS. 1A, 1B, 2A and 2B. A power receiving coil 39 of the cleaning device 33 can also be connected to the power transmission coil 37 in a contactless manner as illustrated in FIGS. 1B and 2B.

The converter 34 and the voltage-resonant inverter 35 are configured integrally in the power adapter 31 shown in FIGS. 1A and 1B. This configuration is suitable for a case where a power cable 40 extends relatively short between the power adapter 31 and the electric shaver 32 or the cleaning device 33. A high frequency current flows through the power cable 40. If an inverter of a power supply device is of a resonance type, it generates a sinusoidal or trapezoidal voltage waveform with a reduced noise component. This makes it possible to reduce the radiation noise generated in a power cable which extends a long distance and the radiation noise caused by a magnetic field which is leaked in a small amount from a coil part for electromagnetic induction coupling. Accordingly, it is possible to get rid of an anti-noise part.

The converter 34 and the voltage-resonant inverter 35 are configured separately in the power adapter 31a shown in FIGS. 2A and 2B. This configuration helps to avoid radiation of a high frequency wave and is suitable for a case where a power cable 40a extends relatively long. A direct current of, e.g., 12V, is adapted to flow through the power cable 40a.

Provided in the electric shaver 32 are a load circuit 41 formed of a secondary battery, an electric motor and the like, and a step-down power converter 42 formed of an A/D converter and adapted to generate a direct current of, e.g., 3V, suitable for use in the load circuit 41, by use of the alternating current generated in the power receiving coil 38. Furthermore, a cleaning device driving circuit 43 biased with the alternating current generated in the power receiving coil 39 is provided in the cleaning device 33.

Figure 3:
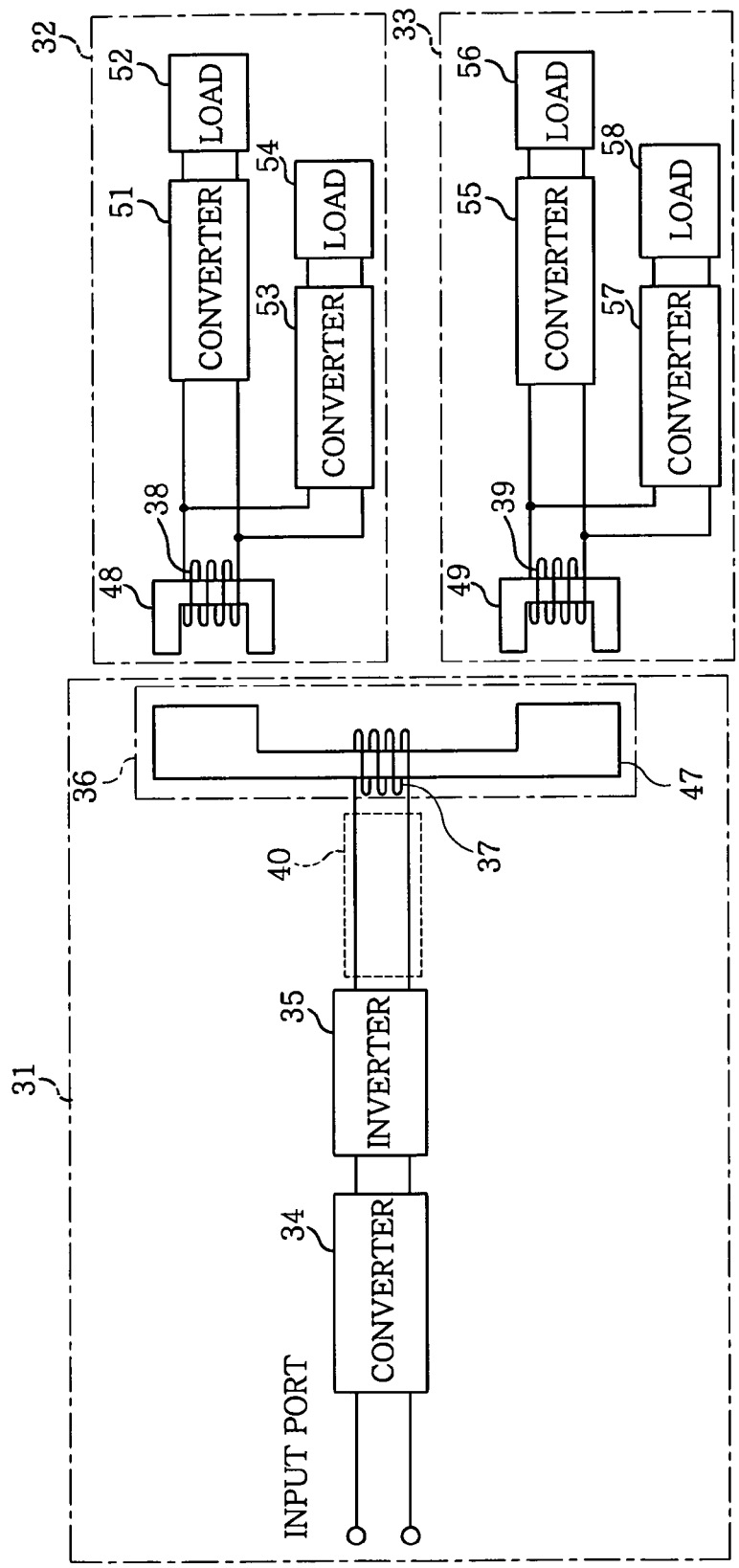
FIG. 3 is a block diagram illustrating an electric configuration of the power supply system shown in FIGS. 1A and 1B.
Figure 4:
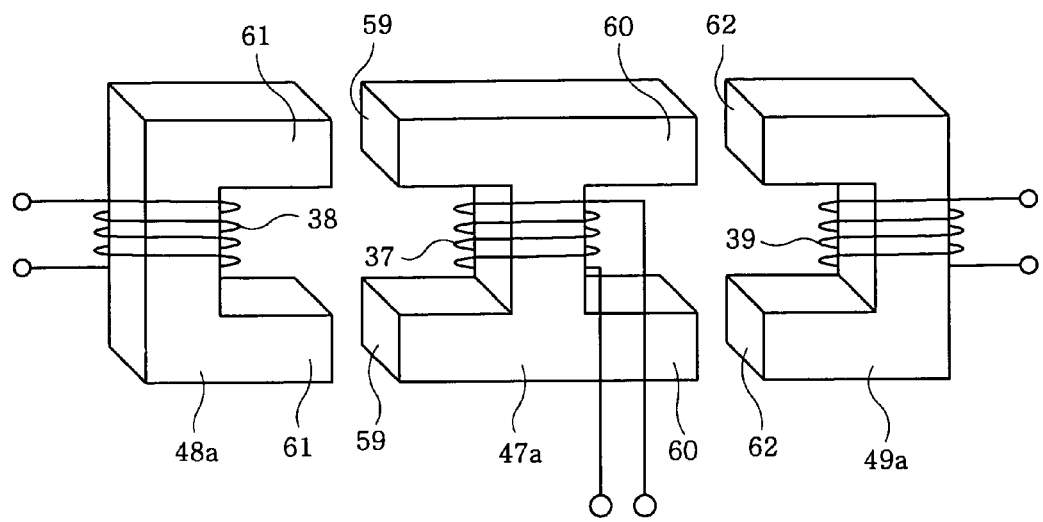
FIG. 4 is a perspective view showing a structure of individual coils wound around cores to perform a contactless power feeding operation in the power supply system shown in FIG. 1 or FIG. 2.

FIG. 3 is a block diagram illustrating an electric configuration of the power supply system shown in FIGS. 1A and 1B. Parts corresponding to those of the configuration shown in FIGS. 1A and 1B will be designated by like reference numerals, with no description given in that respect. In the power adapter 31, the power transmission coil 37 serving as a primary coil is wound around a primary core 47 made of a magnetic material. In the electric shaver 32, the power receiving coil 38 serving as a secondary coil is wound around a secondary core 48 made of a magnetic material. Similarly, in the cleaning device 33, the power receiving coil 39 serving as a secondary coil is wound around a secondary core 49 made of a magnetic material. In this way, the secondary cores 48 and 49 are connected to the primary core 47 in parallel through magnetic flux, thereby performing the contactless power transmission based on electromagnetic induction.

The electric shaver 32 includes a converter 51 serving as the step-down power converter 42, a load circuit 52, such as an electric motor and the like, connected to the converter 51, a converter 53 arranged in parallel with the converter 51, and a load circuit 54, such as a microcomputer and the like, driven by the converter 53. The cleaning device 33 includes a converter 55, a load circuit 56, such as a cleaning water pumping motor, a drying fan, a drying-purpose induction heating circuit and the like, connected to the converter 55, a converter 57 arranged in parallel with the converter 55, and a load circuit 58, such as a microcomputer and the like, driven by the converter 57.

Attention is drawn to the fact that, in the present invention, the power transmission coil 37 of the power adapter 31 or 31a lies in proximity with both of the power receiving coils 38 and 39 to perform a parallel power feeding operation under the state that the electric shaver 32 is mounted on the cleaning device 33, as illustrated in FIGS. 1B and 2B. Taking this into account, the cleaning device 33 is provided with a slot 59a for reception of the power feeding plug 36 of a plate shape. The power receiving coil 38 in the cleaning device 33 is attached to the back side of the slot 59a within a nonmagnetic casing 59b. In the electric shaver 32, the power receiving coil 38 is arranged within a nonmagnetic casing 59c so that it can face the power feeding plug 36 when the electric shaver 32 is mounted on the cleaning device 33.

FIGS. 4 through 9 show the structures of the individual coils 37, 38 and 39 wound around the cores 47, 48 and 49. In the structure shown in FIG. 4, a primary core 47a forms magnetic circuits with a plurality of independently arranged secondary cores 48a and 49a. To this end, the primary core 47a is formed into an "I"-like shape and has two pairs of protrusions 59 and 60, each of the pairs of protrusions extending in the same direction, one of the pairs of protrusions oriented in the opposite direction with respect to the other. In a corresponding fashion, each of the secondary cores 48a and 49a is formed into a square bracket shape and has a pair of protrusions 61 or 62 extending in the same direction. The respective protrusions 59 and 60 of the primary core 47a are arranged to face the corresponding protrusions 61 and 62 of the secondary cores 48a and 49a, thus forming magnetic circuits. The protrusions 59 and 60 are greater in cross-sectional area than the protrusions 61 and 62 so as to realize a high magnetic coupling ratio, thereby providing a system that exhibits enhanced power transmission efficiency.

As a consequence, there is provided a three-stage stack structure wherein the secondary cores 48a and 49a serving as two input port cores of the load devices are arranged on the opposite sides of the primary core 47a serving as an output port core. As illustrated in FIGS. 1B and 2B, the power feeding plug 36 is inserted between the cleaning device 33 and the electric shaver 32. By doing so, it is possible to perform a simultaneous power feeding operation for two load devices with a simplified and compact structure.

Figure 5:
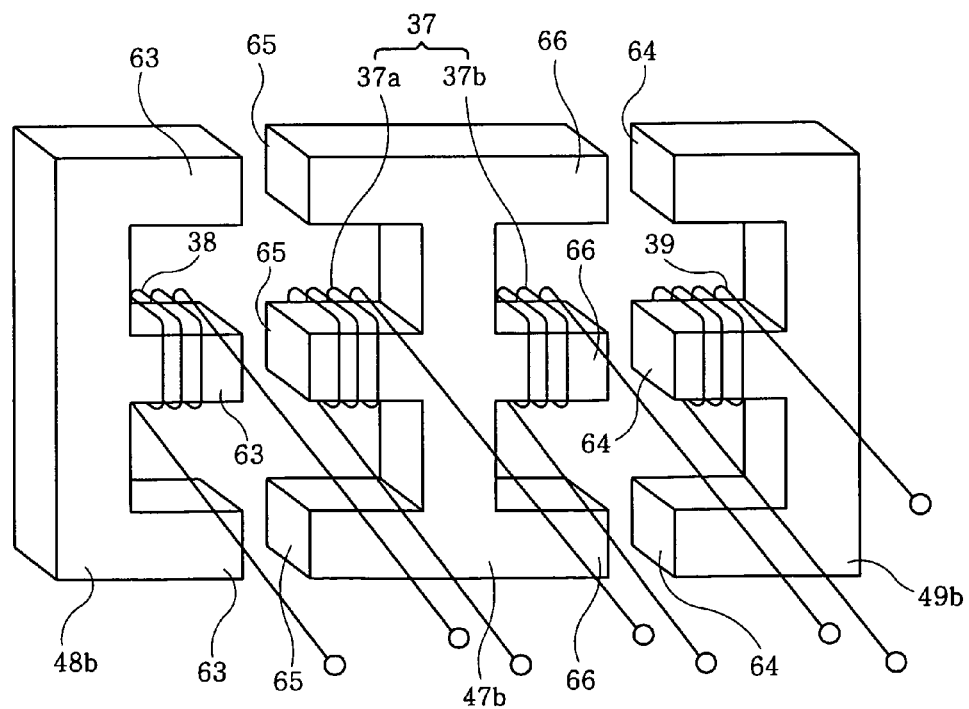
FIG. 5 is a perspective view showing another structure of individual coils wound around cores to perform a contactless power feeding operation in the power supply system shown in FIG. 1 or FIG. 2.

In the structure shown in FIG. 5, secondary cores 48b and 49b are formed into an "E"-like shape to have three protrusions 63 and 64. Likewise, a primary core 47b is shaped to have a plurality of protrusions 65 and 66 that face the protrusions 63 and 64 of the "E"-like secondary cores 48b and 49b to form magnetic circuits. For this reason, the primary coil 37 is divided into two coils 37a and 37b.

This configuration also ensures that a high magnetic coupling ratio is achieved between the primary core 47b serving as an output port core and the secondary cores 48b and 49b serving as two input port cores of the load devices, while realizing a three-stage stack structure.

Figure 6:
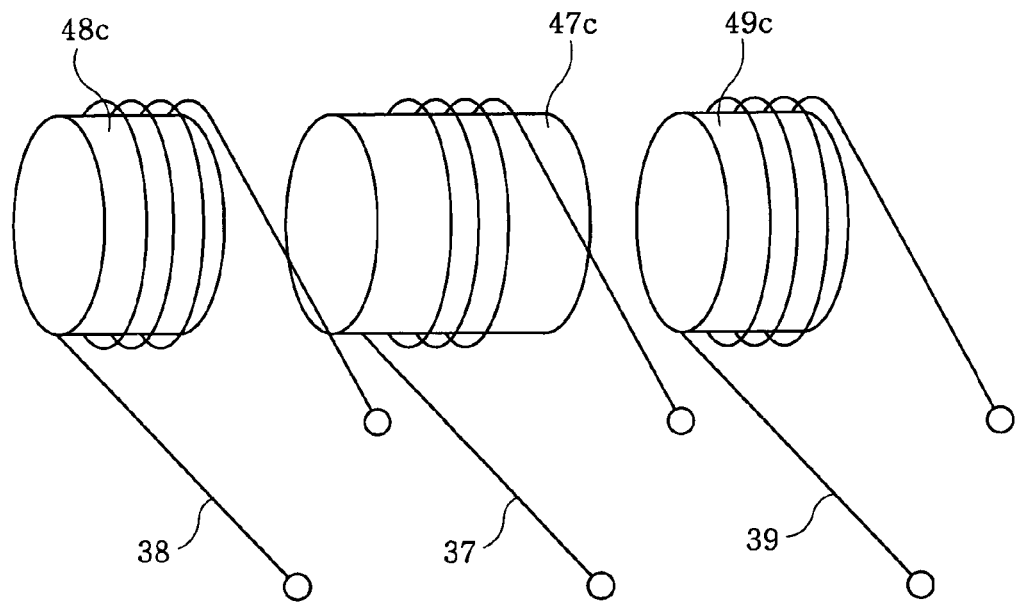
FIG. 6 is a perspective view showing a further structure of individual coils wound around cores to perform a contactless power feeding operation in the power supply system shown in FIG. 1 or FIG. 2.

In the structure shown in FIG. 6, cores 47c, 48c and 49c are of a cylindrical shape or a rectangular column shape (cylindrical shape in FIG. 6) and coils 37, 38 and 39 are wound around the outer circumferences of the cores 47c, 48c and 49c. The cores 47c, 48c and 49c are arranged rectilinearly in an end-to-end relationship. This configuration also makes sure that a high magnetic coupling ratio is achieved between the primary core 47c serving as an output port core and the secondary cores 48c and 49c serving as two input port cores of the load devices, while realizing a three-stage stack structure.

Figure 7:
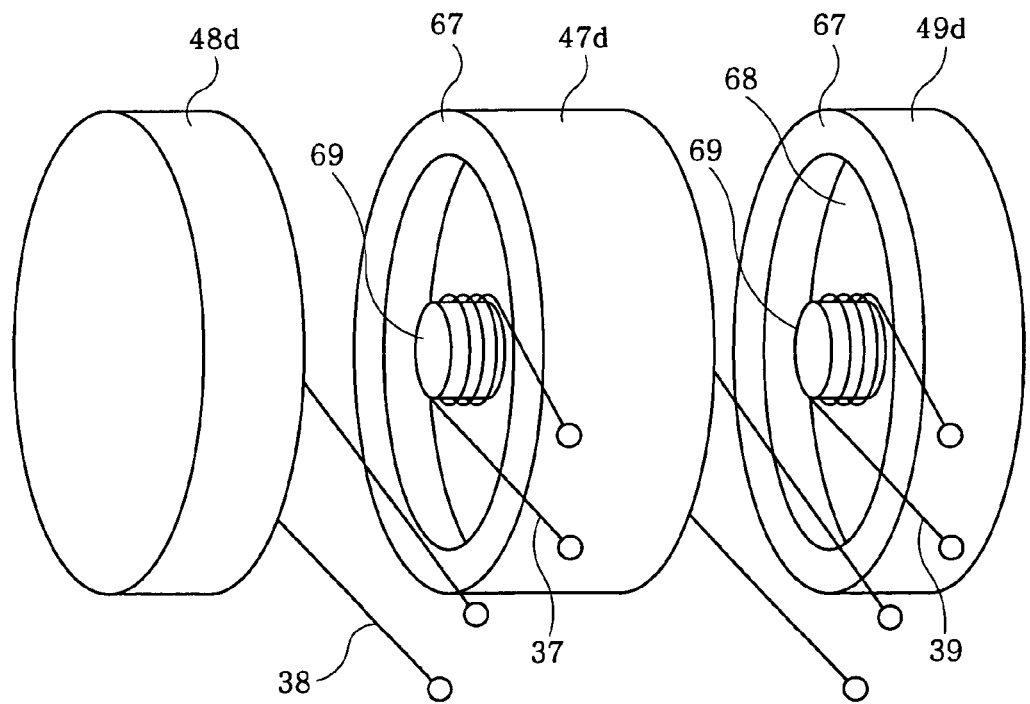
FIG. 7 is a perspective view showing a still further structure of individual coils wound around cores to perform a contactless power feeding operation in the power supply system shown in FIG. 1 or FIG. 2.
Figure 8:
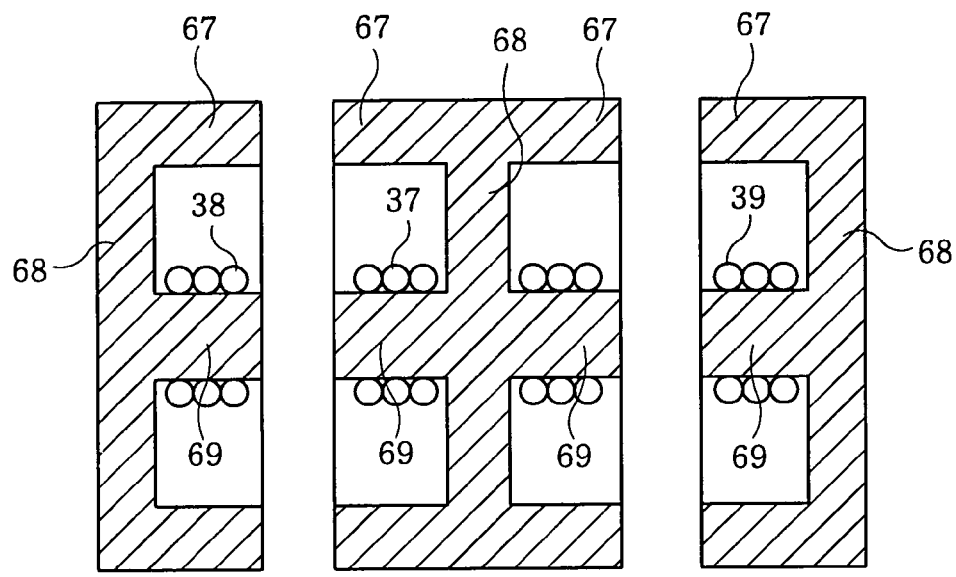
FIG. 8 is a cross sectional view of the structure of individual coils wound around cores shown in FIG. 7.

The structure illustrated in FIGS. 7 and 8 is similar to the structures shown in FIGS. 5 and 6. Two secondary cores 48d and 49d are of a so-called pot core shape and are respectively provided with a tubular body 67, an end plate 68 closing off one end portion of the tubular body 67 and a concentric post 69 erected from the center of the end plate 68. Coils 38 and 39 are wound around the posts 69 of the secondary cores 48d and 49d. Corresponding to the secondary cores 48d and 49d, a primary core 47d is of a shape looking as if the secondary cores 48d and 49d are united in a back-to-back relationship. The primary core 47d is provided with two posts 69 wound with coils 37. Thus, the tubular bodies 67 and the posts 69 of the secondary cores 48d and 49d are arranged to face those of the primary core 47d, forming magnetic circuits closed off by the end plates 68. Leakage of magnetic flux is kept small because the posts 69 wound with the coils 37, 38 and 39 are enclosed by the tubular bodies 67.

This configuration also ensures that a high magnetic coupling ratio is achieved between the primary core 47d serving as an output port core and the secondary cores 48d and 49d serving as two input port cores of the load devices, while realizing a three-stage stack structure.

Figure 9:
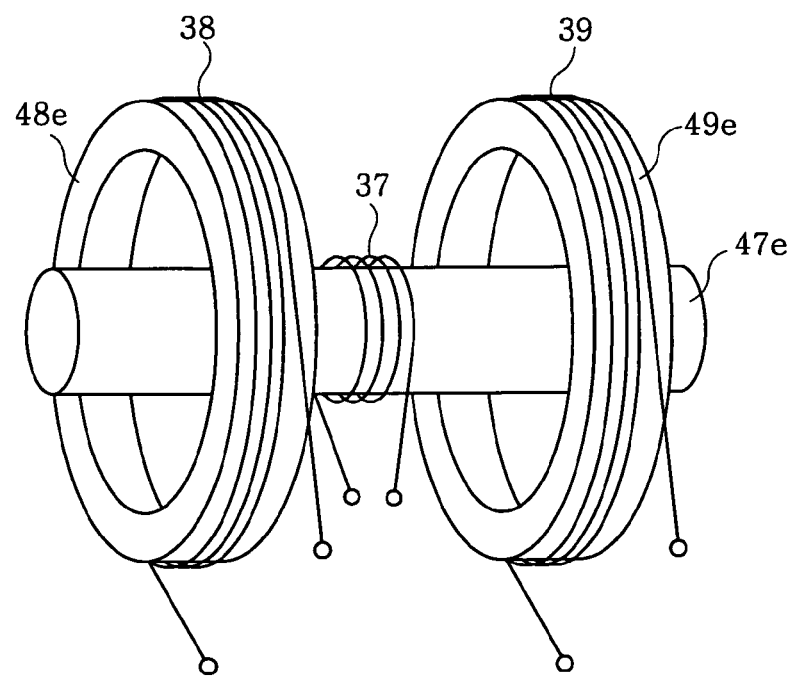
FIG. 9 is a perspective view showing an yet still further structure of individual coils wound around cores to perform a contactless power feeding operation in the power supply system shown in FIG. 1 or FIG. 2.

In the structure shown in FIG. 9, a primary core 47e is of an elongated cylindrical shape or an elongated rectangular column shape (cylindrical shape in FIG. 9). Two secondary cores 48e and 49e are formed into a ring shape, allowing the opposite end portions of the primary core 47e to pass through the centers of the secondary cores 48e and 49e. Secondary coils 38 and 39 are wound around the outer circumferences of the cores 48e and 49e.

This configuration also ensures that a high magnetic coupling ratio is achieved between the primary core 47e serving as an output port core and the secondary cores 48e and 49e serving as two input port cores of the load devices, while realizing a three-stage stack structure. In this configuration, however, recesses (not shown) for receiving the primary core 47e need to be formed on the casings 59b and 59c.

Use of the structures of cores and coils illustrated in FIGS. 4 through 9 makes it possible to perform a contactless parallel power feeding operation by means of a simple and compact three-stage stack structure in which the power transmission coil 37 lies in proximity with both of the power receiving coils 38 and 39. This eliminates the need to provide a power conversion unit such as a converter, an inverter or the like in the cleaning device 33, which would otherwise be required in feeding electric power to the electric shaver 32 under the state that the electric shaver 32 is mounted on the cleaning device 33.

Second Embodiment

Figure 10A:
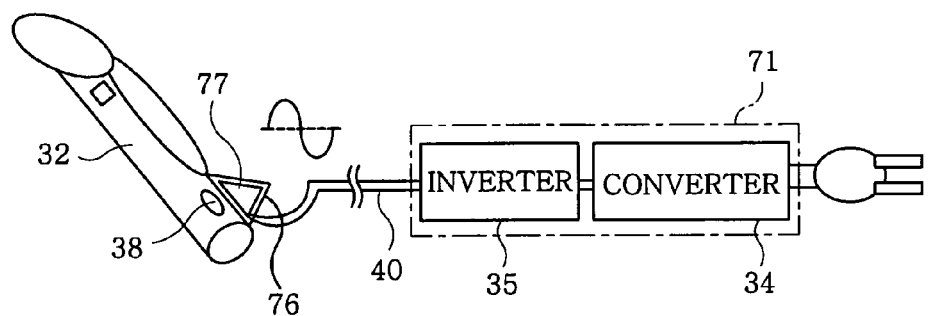
FIGS. 10A and 10B show configurations of a power supply system in accordance with a second embodiment of the present invention.
Figure 10B:
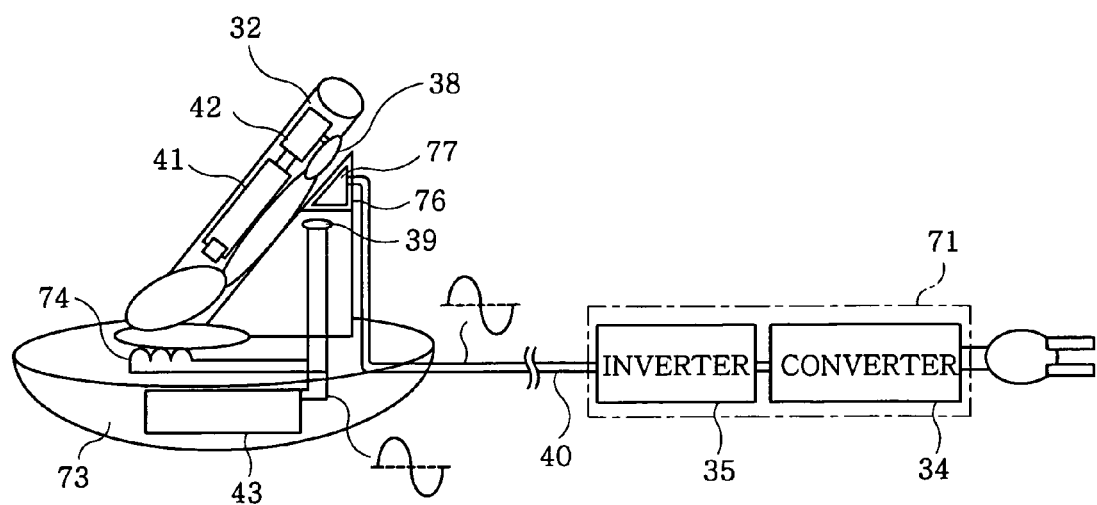

FIGS. 10A and 10B show configurations of a power supply system in accordance with a second embodiment of the present invention. The power supply system is for use in an electric shaver with a cleaning device and is similar to the system shown in FIGS. 1A to 2B. Corresponding parts will be designated by like reference numerals, with no description given in that regard. Attention is invited to the fact that, in the system of this embodiment, a power feeding plug 76 of a power adapter 71 is formed into a wedge shape, as illustrated in FIG. 10B, in order to cope with the inclined mounting of the electric shaver 32 on the cleaning device 73. As in the power adapter 31a illustrated in FIGS. 2A and 2B, the converter 34 and the voltage-resonant inverter 35 may be separated from each other, with a direct current being transmitted through the power cable 40a.

An induction heating coil 74 for drying a blade of the electric shaver 32 by induction heating is connected to the cleaning device 73 in parallel with the cleaning device driving circuit 43. The induction heating coil 74 is activated by a switch not shown in the drawings and controlled by the cleaning device driving circuit 43 to thereby induction-heat and dry the blade of the electric shaver 32 with a high frequency alternating current of 50 kHz at the end of a cleaning process.

Figure 11:
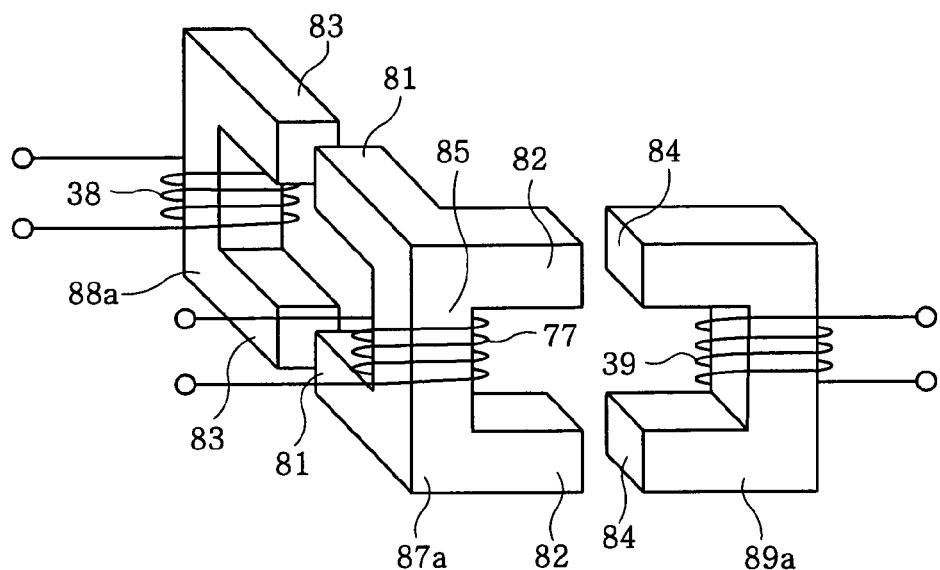
FIG. 11 is a perspective view showing a structure of individual coils wound around cores to perform a contactless power feeding operation in the power supply system shown in FIGS. 10A and 10B.

FIG. 11 is a perspective view showing a structure of cores 87a, 88a and 89a wound with a power transmission coil 77 of the power feeding plug 76 and the power receiving coils 38 and 39. In the structure shown in FIG. 11, a primary core 87a forms magnetic circuits with two independently arranged secondary cores 88a and 89a. To this end, the primary core 87a has two pairs of protrusions 81 and 82, each of the pairs of protrusions extending in the same direction, one of the pairs of protrusions oriented in an orthogonal direction with respect to the other. In other words, the protrusions 81 and 82 are formed into an "L"-like shape when viewed from an axial direction of a shaft portion 85 wound with the power transmission coil 77. In a corresponding fashion, each of the secondary cores 88a and 89a is formed into a square bracket shape and has a pair of protrusions 83 or 84 extending in the same direction, just like the terminal cores 48a and 49a shown in FIG. 4. The respective protrusions 81 and 82 of the primary core 87a are arranged to face the corresponding protrusions 83 and 84 of the secondary cores 88a and 89a, thus forming magnetic circuits. The protrusions 81 and 82 are greater in cross-sectional area than the protrusions 83 and 84 so as to realize a high magnetic coupling ratio, thereby providing a system that exhibits enhanced power transmission efficiency.

As a consequence, there is provided an "L"-like structure wherein the primary core 47a serving as an output port core is sandwichedly placed between the secondary cores 88a and 89a serving as two input port cores of the load devices, so as to have an "L"-like shape when viewed from the axial direction. If the electric shaver 32 is slantingly mounted on the cleaning device 73 as illustrated in FIG. 10B, the primary core 87a can be in close proximity with the secondary cores 88a and 89a respectively received in the electric shaver 32 and the cleaning device 73.

Figure 12:
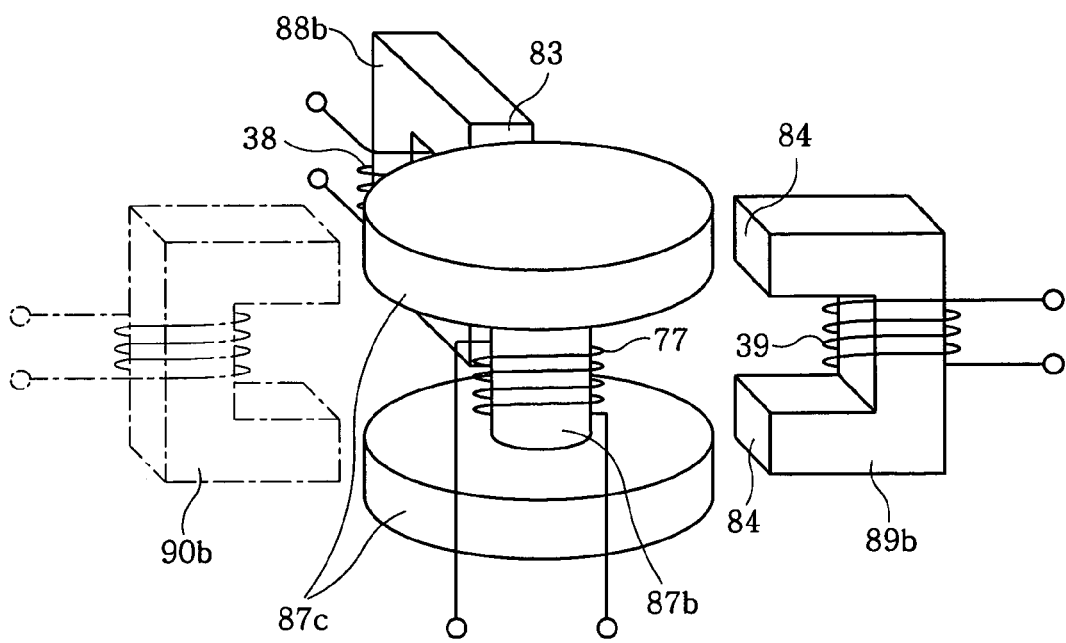
FIG. 12 is a perspective view showing another structure of individual coils wound around cores to perform a contactless power feeding operation in the power supply system shown in FIG. 10.

FIG. 12 is a perspective view showing a structure of cores 87b, 88b and 89b wound with the power transmission coil 77 of the power feeding plug 76 and the power receiving coils 38 and 39. In the structure shown in FIG. 12, two secondary cores 88b and 89b are the same as the cores 88a and 89a set forth above. Attention needs to be directed to the fact that, in this embodiment, a primary core 87b is formed into a bobbin shape. The secondary cores 88b and 89b of a square bracket shape are arranged in plural numbers around the primary core 87b in such a manner that the protrusions 83 and 84 on the opposite end of the secondary cores 88b and 89b can face the flanges 87c of the primary core 87b. This makes it possible to simultaneously feed electric power to the corresponding load devices.

If the flanges of a bobbin is allowed to serve as protrusions extending from the primary core 87b toward the secondary cores 88b and 89b in this manner, magnetic paths can be formed by merely arranging the secondary cores 88b and 89b around the primary core 87b. This means that the secondary cores can be arranged in the number decided by the diameter or the like of the power receiving coils 38 and 39 wound around the center portion of the square-bracket-shaped secondary cores. Three secondary cores including the one designated by reference numeral 90b are arranged in the embodiment shown in FIG. 12.

Use of the structures of cores and coils illustrated in FIGS. 11 and 12 makes it possible to feed electric power to two slantingly mounted load devices in a contactless and parallel manner with a simple and compact "L"-like structure in which the power receiving coils 38 and 39 are disposed on the opposite sides of the power transmission coil 77.

Third Embodiment

Figure 13:
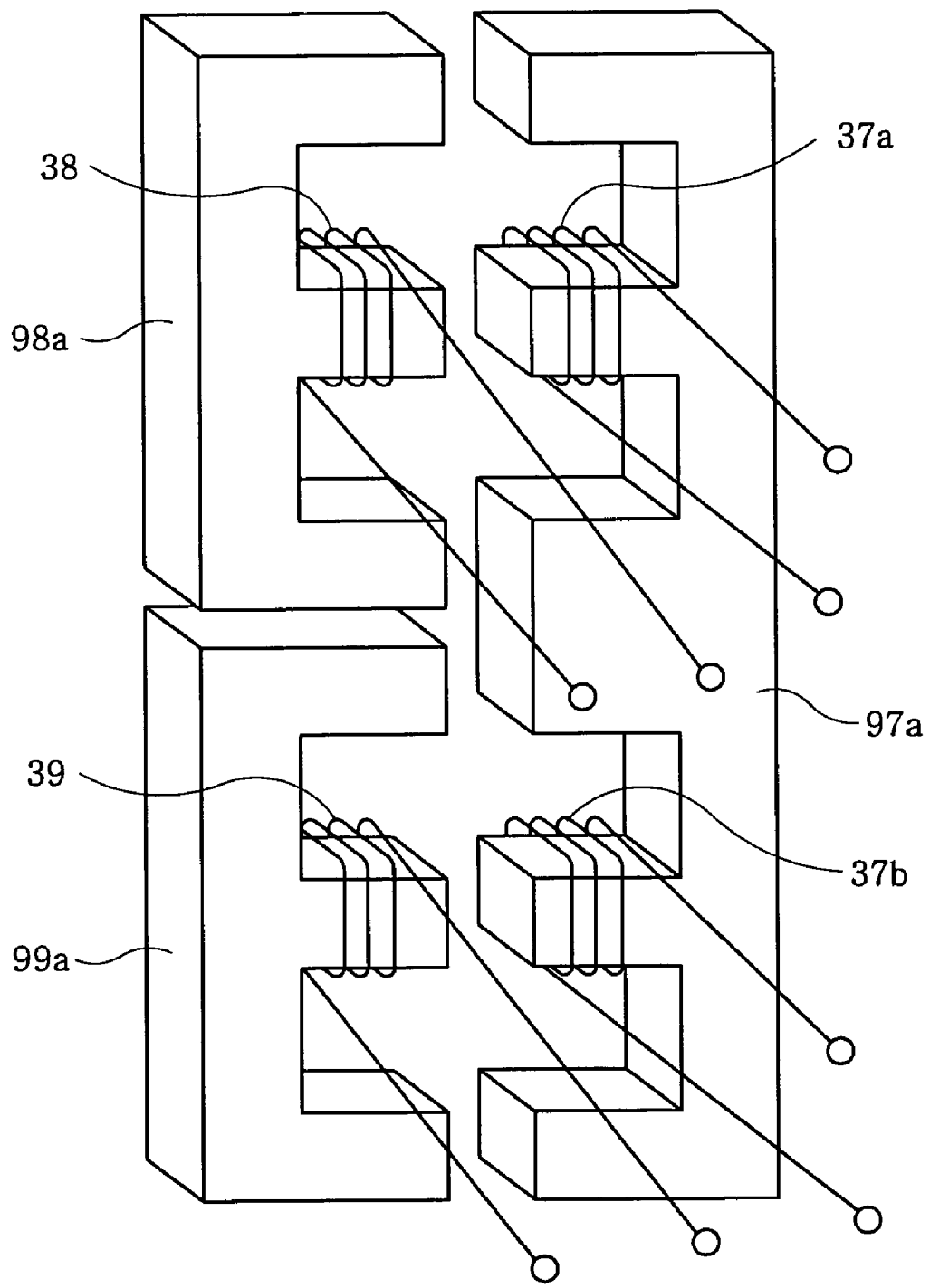
FIG. 13 is a perspective view showing a structure of cores wound with power transmission coils and power receiving coils in a power supply system in accordance with a third embodiment of the present invention.
Figure 14:
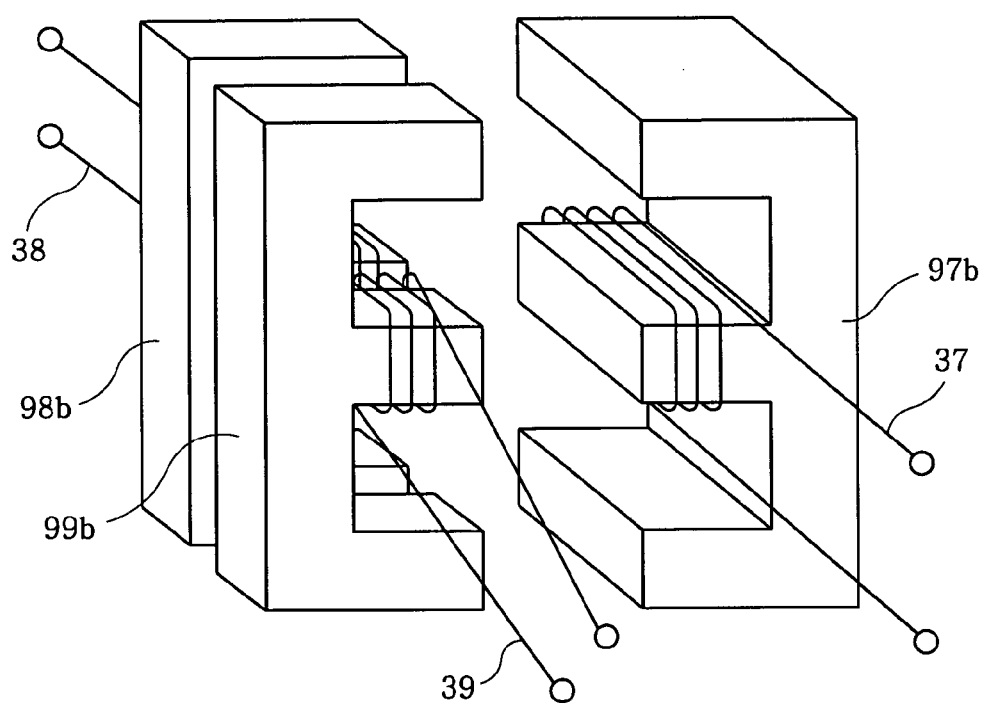
FIG. 14 is a perspective view showing a structure of cores wound with a power transmission coil and power receiving coils in the power supply system in accordance with the third embodiment of the present invention.
Figure 15:
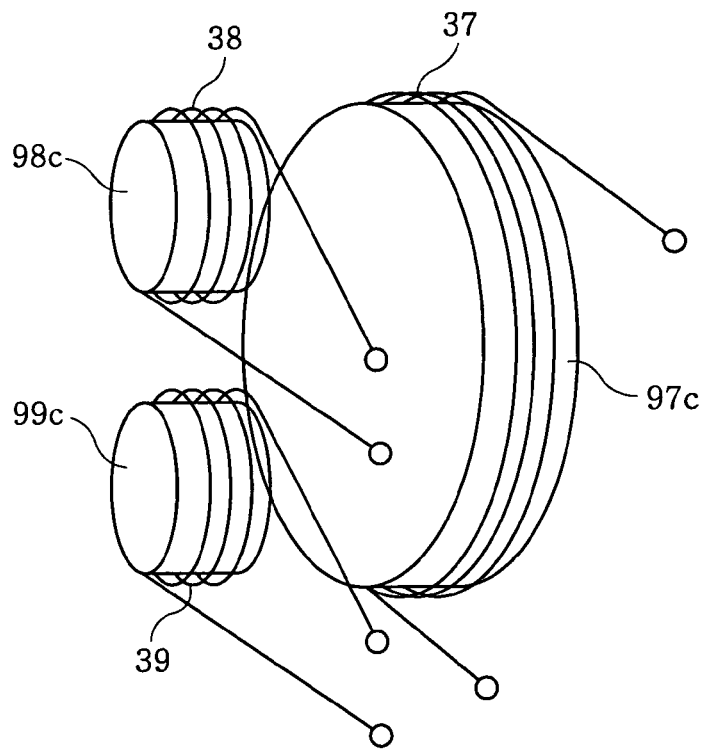
FIG. 15 is a perspective view showing a structure of cores wound with a power transmission coil and power receiving coils in the power supply system in accordance with the third embodiment of the present invention.

FIGS. 13 through 15 are perspective views showing the structures of cores 97a-99a, 97b-99b and 97c-99c wound with a power transmission coil 37 and power receiving coils 38 and 39 in a power supply system in accordance with a third embodiment of the present invention. In respect of the respective cores 97a-99a, 97b-99b and 97c-99c, it is to be noted that the cores 98a, 98b, 98c, 99a, 99b and 99c wound with the power receiving coils 38 and 39 are arranged on one side of the cores 97a, 97b and 97c wound with the power receiving coil 37.

In the cores 97a, 98a and 99a shown in FIG. 13, the secondary cores 98a and 99a are of an "E"-like shape as with the secondary cores 48b and 49b illustrated in FIG. 5. The primary core 97a is of a structure in which two "E"-like cores are connected to each other in a longitudinal direction in such a fashion that the primary core 97a can face the secondary cores 98a and 99a arranged on one side thereof in a longitudinal (vertical) direction. For this reason, the power transmission coil 37 is divided into two coils 37a and 37b. The cross-sectional area of the facing portions of the primary core 97a is equal to or greater than the total cross-sectional area of the facing portions of secondary cores 98a and 99a.

In the cores 97b, 98b and 99b shown in FIG. 14, the secondary cores 98b and 99b are of an "E"-like shape as with the secondary cores 48b, 49b, 98a and 99a set forth above. The primary core 97b is of a structure in which two "E"-like cores are connected to each other in a thickness direction in such a fashion that the primary core 97b can face the secondary cores 98b and 99b arranged on one side thereof in a thickness (transverse) direction. The cross-sectional area of the facing portions of the primary core 97b is equal to or greater than the total cross-sectional area of the facing portions of secondary cores 98b and 99b.

In the cores 97c, 98c and 99c shown in FIG. 15, the secondary cores 98c and 99c are of a cylindrical shape or a rectangular column shape (cylindrical shape in FIG. 15) as with the secondary cores 48c and 49c illustrated in FIG. 6. The power transmission is performed by allowing the magnetic flux of the primary side to flow across the secondary coils 38 and 39. The primary core 97c is formed into a disk shape such that it can face the secondary cores 98c and 99c arranged on one side thereof side by side (in a transverse direction).

Use of the structures shown in FIGS. 13 through 15 ensures that the power transmission is properly performed for two juxtaposed load devices.

Fourth Embodiment

Figure 16:
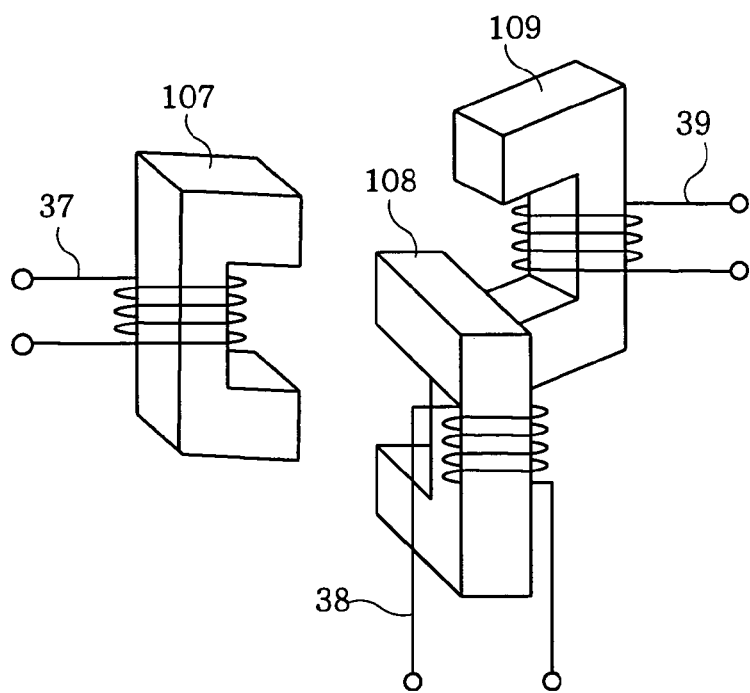
FIG. 16 is a perspective view showing a structure of cores wound with a power transmission coil and power receiving coils in a power supply system in accordance with a fourth embodiment of the present invention.
Figure 17A:
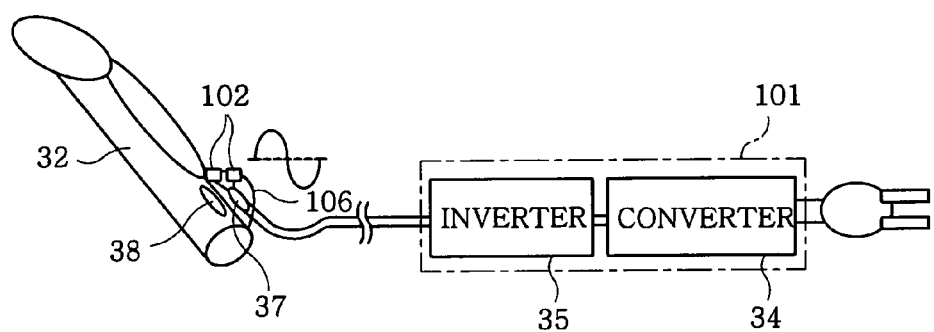
FIGS. 17A and 17B show configurations of a power supply system in accordance with a fifth embodiment of the present invention.
Figure 17B:
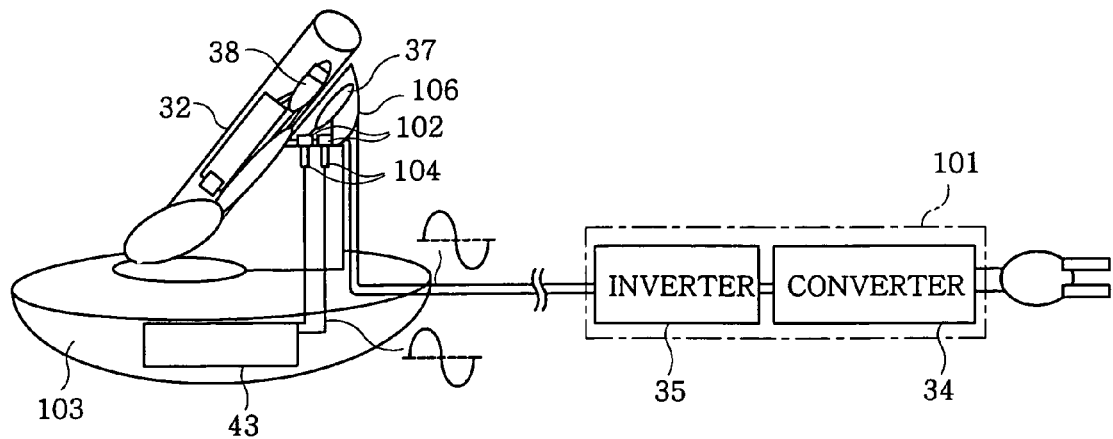
Figure 18A:
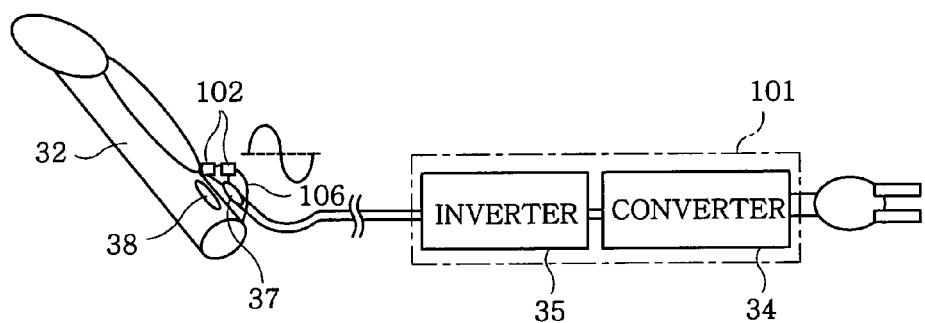
FIGS. 18A and 18B show other configurations of a power supply system in accordance with the fifth embodiment of the present invention.
Figure 18B:
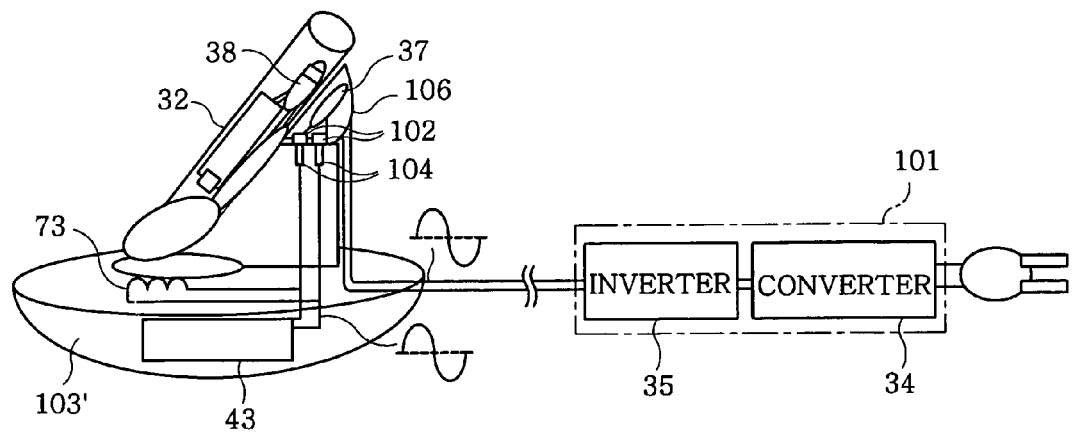

FIG. 16 is a perspective view showing the structure of cores 107, 108 and 109 wound with a power transmission coil 37 and power receiving coils 38 and 39 in a power supply system in accordance with a fourth embodiment of the present invention. It is to be noted that, in this embodiment, the respective coils 37, 38 and 39 are wound around the cores 107, 108 and 109 of a square bracket shape which in turn are arranged at an equal interval of 120 degrees when viewed from the top or bottom thereof. This configuration also ensures that the electric power is evenly transmitted from one power transmission coil 37 to two power receiving coils 38 and 39.

The present invention is directed to a power supply system in which a voltage of the same frequency as that of the high frequency voltage applied to a high frequency power cable of a power supply device is applied to a power cable of a particular electric device. However, the voltage-current relationship has something to do with impedance. Thus, in case where the output power of an inverter of a power supply device equivalently constitutes a high frequency current source, an electric current of the same frequency may flow through a power cable of a particular electric device, which also falls within the scope of the present invention. Seeing that the present invention pertains to a system capable of performing a simultaneous parallel power feeding operation with respect to a plurality of particular electric devices, a high frequency alternating voltage is generated in the input port of the particular electric devices. An electronic switch, a mechanical switch, a converter circuit or the like, which serves to control energization, may be provided on a power cable or a circuit connected to the input port within particular electric devices, thereby making it possible to control a power feeding operation within the electric devices. It is a matter of course that this configuration is also within the scope of the present invention.

Fifth Embodiment

Figure 19:
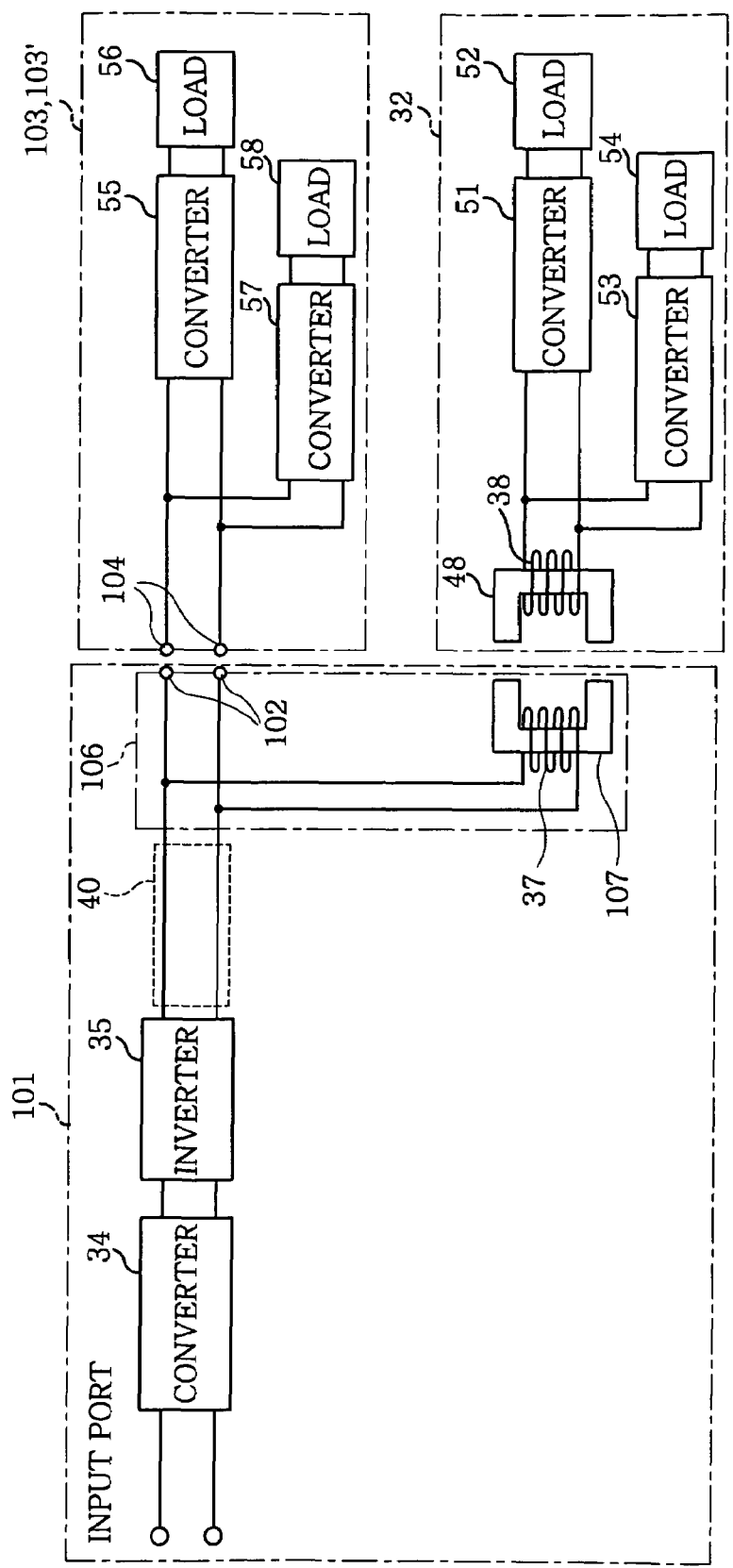
FIG. 19 is a block diagram illustrating an electric configuration of the power supply system shown in FIG. 17A and 17B.

FIGS. 17A to 18B show configurations of a power supply system in accordance with a fifth embodiment of the present invention. This power supply system is for use in an electric shaver with a cleaning device and is similar to the systems shown in FIGS. 1A to 3 and FIGS. 10A and 10B. Corresponding parts will be designated by like reference numerals, with no description given in that regard. As shown in FIG. 19, in the power feeding plug 106 of a power adapter 101 of this embodiment, the power transmission coil 37 is wound around a primary core 107 for the electric shaver 32 and a metal contact 102 for power transmission to the cleaning device 103 or 103' is used together. The cleaning device 103 shown in FIG. 17B differs from the cleaning device 103' illustrated in FIG. 18B in terms of presence or absence of the induction heating coil 73.

In a corresponding manner, a power receiving metal contact 104 is provided on the cleaning device 103 or 103'. The metal contacts 102 and 104 are made of a material exhibiting high erosion resistance. Through the use of the power cable 40 for an alternating current of 50 kHz, a contactless power feeding operation may be performed with respect to the electric shaver 32 in which it is desirable not to expose any metal contact on a design surface, and a contacting type power feeding operation may be performed with respect to the cleaning device 103 or 103' in which power consumption is high and power loss needs to be avoided. The contacting type power feeding operation is cost-effective.

Sixth Embodiment

Figure 20A:
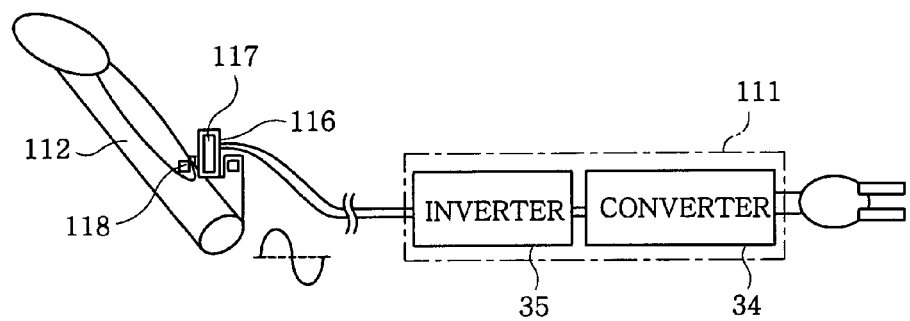
FIGS. 20A and 20B show configurations of a power supply system in accordance with a sixth embodiment of the present invention.
Figure 20B:
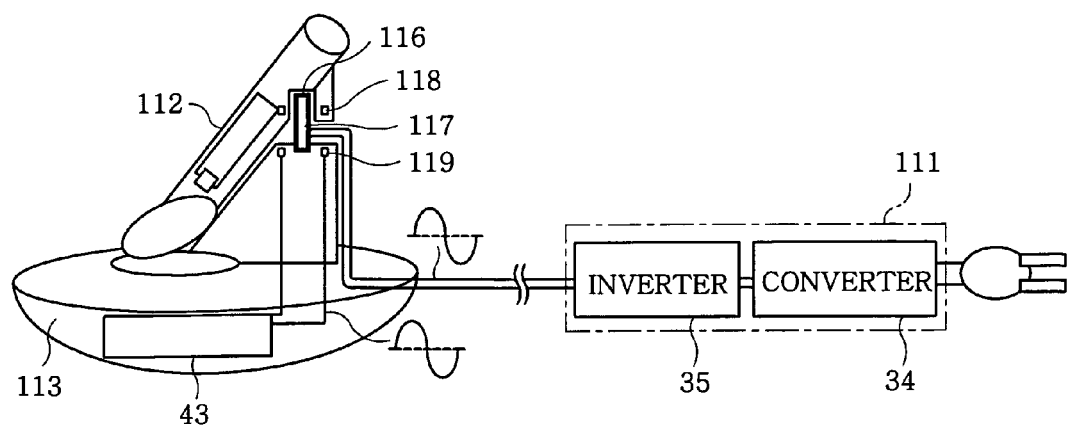
Figure 21A:
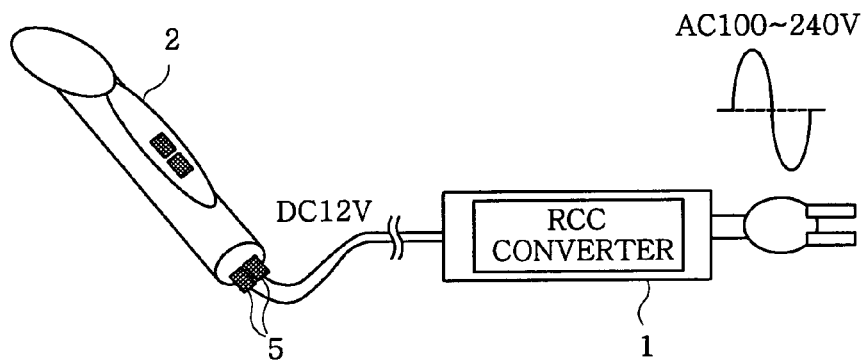
FIGS. 21A and 21B show configurations of a conventional contacting type power supply system.
Figure 21B:
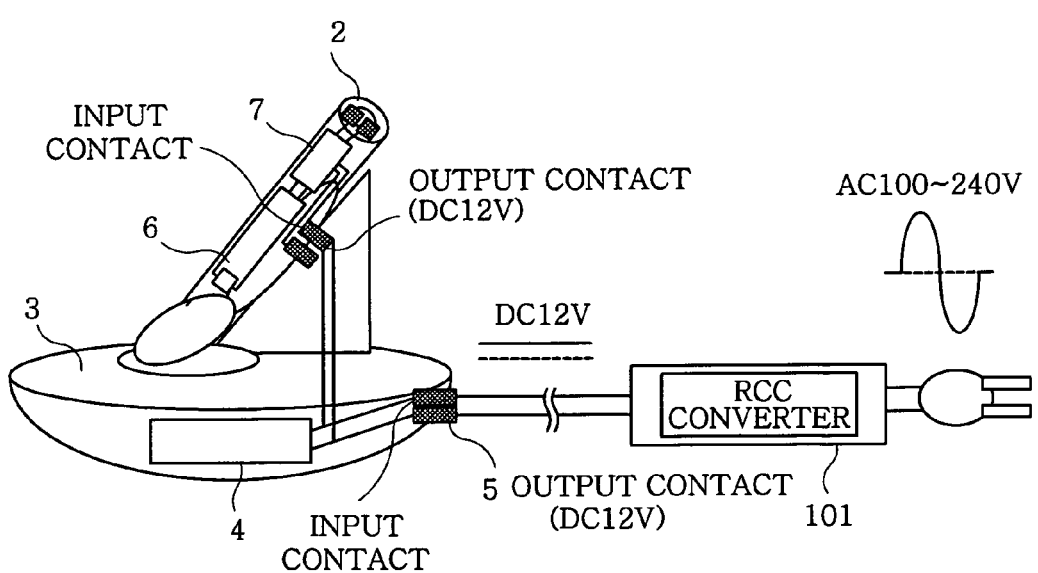
Figure 22:
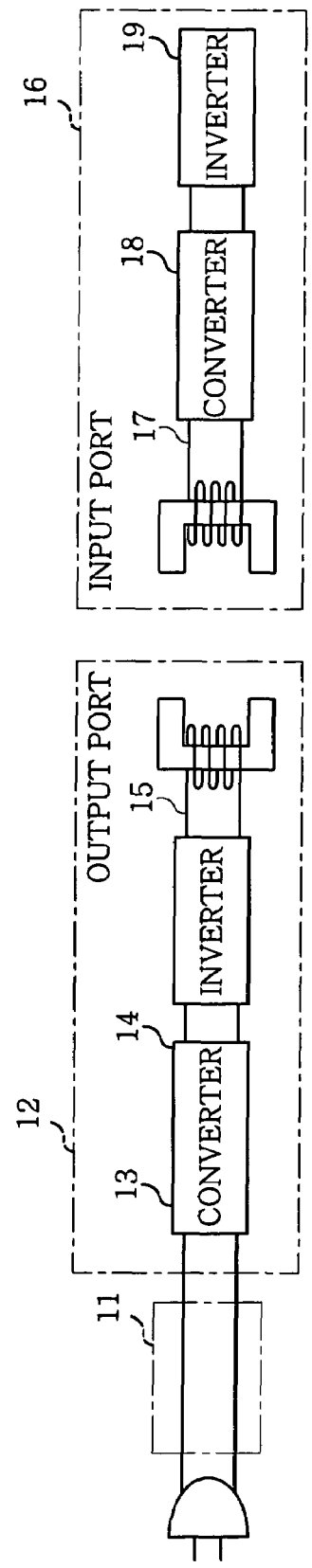
FIG. 22 shows a configuration of a conventional non-contacting type power supply system.
Figure 23A:
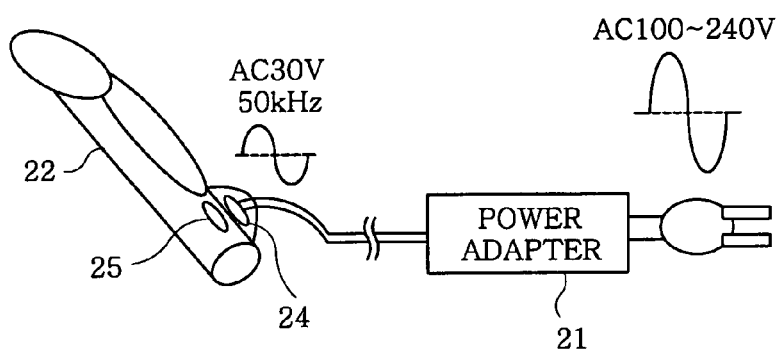
FIGS. 23A and 23B show configurations in which the non-contacting type power supply system shown in FIG. 22 is applied to the contacting type power supply system shown in FIGS. 21A and 21B.
Figure 23B:
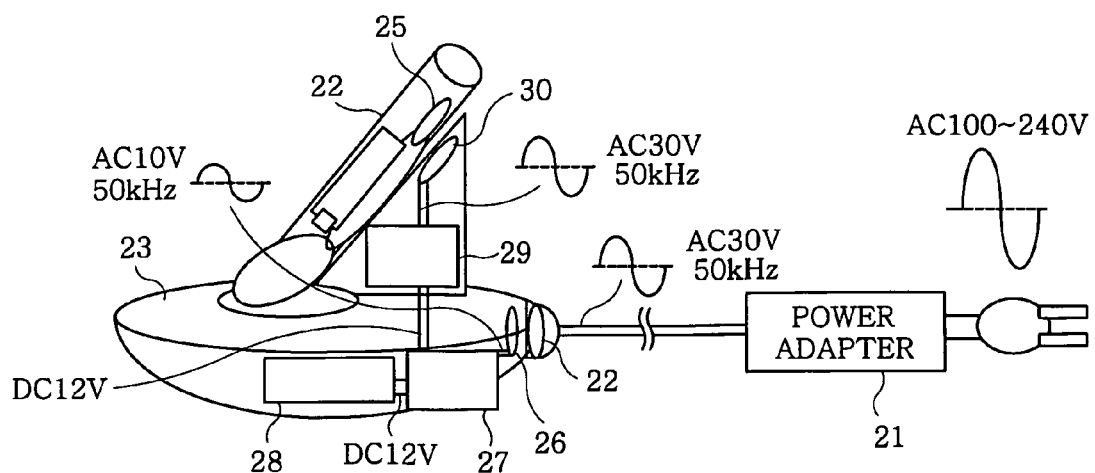

FIGS. 20A and 20B show configurations of a power supply system in accordance with a sixth embodiment of the present invention. This power supply system is for use in an electric shaver with a cleaning device and is similar to the system shown in FIGS. 10A and 10B. Corresponding parts will be designated by like reference numerals, with no description given in that regard. In an electric shaver 112 and a cleaning device 113 of this embodiment, the power receiving coils 118 and 119 serving as a secondary coil is configured to have no core. Accordingly, the power transmission coil 117 in the power feeding plug 116 of the power adapter 111 is inserted into the power receiving coils 118 and 119 wound in a ring shape.

While the invention has been shown and described with respect to the preferred embodiments, it will be understood by those skilled in the art that various changes and modification may be made without departing from the scope of the invention as defined in the following claims.

What is claimed is:

1. A power supply system for feeding electric power from a power adapter to a plurality of load devices,
    wherein the power adapter includes:
    a primary core; and
    a primary coil wound around the primary core for serving as a output port of the power adapter to output an alternating current, and
    wherein the load devices include:
    secondary cores for simultaneously forming magnetic circuits between the primary core and the load devices; and
    secondary coils wound around the secondary cores for feeding output power to the load devices.

2. The power supply system of claim 1, wherein the primary core has two pairs of protrusions, each of the pairs of the protrusions extending in a same direction, and one of the pairs of the protrusions oriented in an opposite direction with respect to the other of the pairs of the protrusions, and
    wherein the secondary cores, each of which has a pair of protrusions extending in a same direction, are arranged on opposite sides of the primary core in such a manner that the primary core lies between the secondary cores to feed electric power simultaneously to the load devices.

3. The power supply system of claim 2, wherein an electric shaver serves as a first load device of the load devices, and a cleaning device used for the electric shaver serves as a second load device of the load devices, and
    wherein the electric shaver is to be fed with the electric power directly from the power adapter and to be electrically charged in a state that the electric shaver is mounted on the cleaning device.

4. The power supply system of claim 1, wherein the primary core has two pairs of protrusions and a shaft portion wound with the primary coil, each of the pairs of protrusions extending in a same direction from the shaft portion, and one of the pairs of protrusions oriented in an orthogonal direction with respect to the other of the pairs of protrusions, and
    wherein each of the secondary cores has two pairs of protrusions, each of the pairs of protrusions extending in a same direction, and the secondary cores arranged in such a manner that the secondary cores form an "L"-shape with the primary core when viewed from an axial direction of the shaft portion to feed electric power simultaneously to the load devices.

5. The power supply system of claim 4, wherein an electric shaver serves as a first load device of the load devices, and a cleaning device used for the electric shaver serves as a second load device of the load devices, and
    wherein the electric shaver is to be fed with the electric power directly from the power adapter and to be electrically charged in a state that the electric shaver is mounted on the cleaning device.

6. The power supply system of claim 1, wherein the primary core is formed in a bobbin shape and the secondary cores are formed in a square bracket shape, the secondary cores arranged in plural numbers around the primary core in such a manner that opposite ends of the secondary cores face flanges of the primary core to feed electric power simultaneously to the load devices.

* * * * *